United States Patent
Oleszkiewicz et al.

(10) Patent No.: US 11,010,231 B2
(45) Date of Patent: May 18, 2021

(54) AUTOMATIC LOG GENERATION

(71) Applicant: International Business Machines Corporation, Armonk, NY (US)

(72) Inventors: Maria H. Oleszkiewicz, Smardzowice (PL); Bartlomiej T. Malecki, Slomniki (PL); Blazej R. Rutkowski, Cracow (PL); Daniel J. Ryszka, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/150,534

(22) Filed: Oct. 3, 2018

(65) Prior Publication Data

US 2020/0110654 A1 Apr. 9, 2020

(51) Int. Cl.
*G06F 11/36* (2006.01)
*G06F 11/07* (2006.01)
*G06F 16/18* (2019.01)

(52) U.S. Cl.
CPC ...... *G06F 11/0781* (2013.01); *G06F 11/3624* (2013.01); *G06F 11/3636* (2013.01); *G06F 16/1805* (2019.01)

(58) Field of Classification Search
None
See application file for complete search history.

(56) References Cited

U.S. PATENT DOCUMENTS

| 7,475,073 | B2 | 1/2009 | Leymann |
| 9,552,274 | B2 | 1/2017 | Balachandran |
| 2005/0165809 | A1 | 7/2005 | Leymann |
| 2009/0037894 | A1* | 2/2009 | Unger ............. G06F 8/20 717/162 |
| 2011/0258609 | A1* | 10/2011 | Maczuba ........ G06F 11/0706 717/128 |
| 2012/0144371 | A1* | 6/2012 | Patton ............. G06F 11/0766 717/124 |

(Continued)

FOREIGN PATENT DOCUMENTS

CN 106598843 A 4/2017

OTHER PUBLICATIONS

"Automatic Log Level Adjustment", An IP.com Prior Art Database Technical Disclosure, Disclosed Anonymously, IP.com No. IPCOM000210485D, IP.com Electronic Publication Date: Sep. 6, 2011, 3 pages.

(Continued)

*Primary Examiner* — Daxin Wu
(74) *Attorney, Agent, or Firm* — Grant M. McNeilly (57) ABSTRACT

A computer-implemented method of creating a log file is disclosed. The method comprises: storing a request of a service to be executed by a computer system, wherein the service is performed using multiple software methods; executing the service by providing the request to the computer system; detecting a failure of the service; performing a stack trace of the service to identify a subset of the multiple software methods; providing a source code for the subset of the multiple software methods; modifying the source code for the subset of the multiple software methods to add logging statements, wherein the logging statements are configured for generating log data; re-executing the service using the modified source code to generate the log data; and generating the log file from the log data.

19 Claims, 3 Drawing Sheets

(56) References Cited

U.S. PATENT DOCUMENTS

| | | | |
|---|---|---|---|
| 2015/0039764 A1* | 2/2015 | Beloglazov | H04L 47/70 |
| | | | 709/226 |
| 2015/0278074 A1* | 10/2015 | Carson | G06F 11/3636 |
| | | | 714/38.11 |
| 2015/0286470 A1* | 10/2015 | Dahan | G06F 11/3447 |
| | | | 717/127 |
| 2015/0378863 A1 | 12/2015 | Balachandran | |
| 2016/0306962 A1* | 10/2016 | Lee | G06F 21/567 |
| 2017/0004065 A1* | 1/2017 | Angwin | G06F 11/3668 |
| 2018/0024918 A1* | 1/2018 | Agarwal | G06F 11/3676 |
| | | | 717/125 |
| 2018/0063267 A1 | 3/2018 | Faitelson | |
| 2018/0203795 A1* | 7/2018 | Gadiya | G06F 11/3636 |
| 2018/0253369 A1* | 9/2018 | O'Dowd | G06F 11/323 |
| 2019/0235993 A1* | 8/2019 | Modeel | G06F 11/3696 |

OTHER PUBLICATIONS

"Method for automatically using the result of automated log analysis to manage defects in the defects management system", An IP.com Prior Art Database Technical Disclosure, Disclosed Anonymously, IP.com No. IPCOM000198632D, IP.com Electronic Publication Date: Aug. 11, 2010, 5 pages.

"Branch (computer science)," Wikipedia, accessed Jul. 12, 2020, 7 pages. <https://en.wikipedia.org/wiki/Branch_(computer_science)>.

"Main thread in Java," GeeksforGeeks, accessed Jul. 12, 2020, 11 pages. <https://www.geeksforgeeks.org/main-thread-java/>.

* cited by examiner

AUTOMATIC LOG GENERATION

BACKGROUND

In case of a software failure, log files can be valuable because they can provide detailed information about the execution of the software. There is therefore value in making the log files as detailed as possible. On the other hand, during the normal execution of a program, it is not desirable to produce bloated log files. The log files should be fairly compact to reduce the noise and overall input/output cost of running the application.

Moreover, having a high density of logging instructions can make the source code bloated and difficult to read, which can increase the maintenance costs. It can also be difficult ahead of time, during software development, to predict if logging a particular state will be useful in the future. Some logging statements may be forgotten or omitted during the development phase due to a tight development schedule.

SUMMARY

One embodiment of the present disclosure relates to a computer-implemented method of creating a log file. The method includes storing a request of a service to be executed by a computer system. The service is performed using multiple software methods. The method further includes executing the service by providing the request to a computer system. The method further includes detecting a failure of the service. This may be a failure of the computer system to properly execute the service. If a failure of the service is detected the following steps are performed. The method further includes performing a stack trace of the service to identify a subset of the multiple software methods. For example, the stack trace may indicate which of the multiple software methods had failed and caused the failure of the service. The method further includes providing a source code for the subset of the multiple software methods. The method further includes modifying the source code for the subset of the multiple software methods to add logging statements. The logging statements are configured for generating log data. The method further includes re-executing the service using the modified source code to generate the log data. The method further includes generating the log file from the log data.

According to a further embodiment of the present disclosure, a computer program product for creating a log file is provided, the computer program product including a computer readable storage medium having program instructions embodied therewith, the program instructions executable by a processor to cause the processor to: store a request of a service to be executed by a computer system and execute the service by providing the request to the computer system. The service is performed using multiple software methods. Upon detection of a failure of the service, execution of the program instructions by the processor cause the processor to: perform a stack trace of the service to identify a subset of the multiple software methods, provide source code for the subset of the multiple software methods; modify the source code for the subset of the multiple software methods to add logging statements, wherein the logging statements are configured for generating log data; re-execute the service using the modified source code to generate the log data; and generate the log file from the log data.

According to a further embodiment of the present disclosure, a computer system includes a memory and a processor, wherein the memory stores program instructions executable by the processor, execution of the instructions causes the processor to: store a request of a service to be executed by the computer system and execute the service by providing the request to the computer system. The service is performed using multiple software methods. Upon the detection of a failure of the service, execution of the program instruction further cause the processor to: perform a stack trace of the service to identify a subset of the multiple software methods; provide source code for the subset of the multiple software methods; modify the source code for the subset of the multiple software methods to add logging statements, wherein the logging statements are configured for generating log data; re-execute the service using the modified source code to generate the log data; and generate the log file from the log data.

Embodiments of the present disclosure and/or examples described herein can be freely combined with each other if they are not mutually exclusive.

BRIEF DESCRIPTION OF THE SEVERAL VIEWS OF THE DRAWINGS

The following embodiments of the present disclosure are explained in greater detail, by way of example only, making reference to the drawings in which.

DETAILED DESCRIPTION

Examples may have the advantage that a detailed log file can be constructed only when it is needed. For example, when log files are continuously generated they may produce a large volume of data which is difficult to wade through or may consume machine resources. By modifying the source code only after detecting the failure of the service there is no slowing in the execution of the service by either having additional commands that are executed or by consuming machine resources for generating the log data. Modifying the source code after detecting the failure of the service also enables code to be modified on the fly to generate the log file when needed.

In another example identifying the subset of the multiple software methods comprises identifying objects, object members, method parameters and/or automatic variables for the subset of the multiple software methods. The modifying of the source code for the subset of the multiple software methods comprises adding variable logging statements for the identified objects, object members, method parameters and/or the automatic variables. This example may be beneficial because it provides a means for automatically generating or creating the logging statements which can be added to the source code.

In another example the identification of the subset of the multiple software methods comprises identifying execution branches for the subset of the multiple software methods. The modification of the source code for the subset of the multiple software methods comprises adding decision point logging statements for the identified execution branches. This example may also be beneficial because it provides a means for automatically providing the logging statements which may then be used to generate the log data and thus the log file.

In another example the log data comprises the request. This may be beneficial because this may be useful for an automated program or an operator to determine the reason of the failure.

In another example the service is a microservice. The computer-implemented method may be particularly applicable to a microservice because they tend to be particularly fine grained and lightweight protocols. The use of micro services enables the decomposing or breaking apart of an application into a number of smaller services that improves modularity. This increase in modularity may facilitate the automated generation of the log file.

In another example the method is a hypertext transfer protocol (HTTP) method. An HTTP method is an application which uses the protocol for distributed, collaborative and/or hypermedia information systems. This for example is typically efficient to implement HTTP methods as microservices.

In another example the failure is detected as an HTTP error 500 status code. This type of error code may be beneficial because HTTP error codes in the 500 range indicate a server error. This may indicate that the error was caused by the computer system which is executing the service.

In another example the re-execution of the service is performed in a sandbox environment. The use of the sandbox environment may be beneficial because it may provide an environment where failure of the service a second time will not have a negative effect on other services or interfere with other services being executed by the computer system.

In another example the multiple software methods are at least partially implemented as byte code. Providing the source code for the subset of the multiple software methods comprises decompiling the byte code. This may be beneficial because log files can be provided for services which were not programmed for providing log files.

In another example at least a portion of the multiple software methods are at least partially implemented using a scripting language. Providing the source code for the subset of the multiple software methods comprises providing scripts of the portions of the multiple software methods. They for example may be retrieved from an archive or repository of source code. This example may be particularly efficient because the scripts which are provided for the execution of the service may be readily modified to provide the log file.

In another example the scripting language is any one of the following: JavaScript, Ruby, Python, Perl, TCL, Visual Basic for Applications, and VBScript. The use of any or all of these scripting languages may be beneficial because they provide a straight forward means of providing the source code before modifying the source code. This for example may facilitate the implementation of the service as a microservice and/or an HTTP method.

In another example the method further comprises compiling the modified source code before re-executing the service. This step may for example only be necessary when the source code needs to be recompiled. In some instances, when there is a scripting language, it may not be necessary to recompile the modified source code. In other examples where the source code is another language such as Java, Scala or other compiled programming language this may be performed first.

In another example the providing of the source code comprises decompiling the service. This may be beneficial because in some instances there may be no source code which is available. The automatic decompiling of the service and then the modification of this decompiled code and the recompilation may enable the adding of logging statements where it was not possible previously.

In another embodiment the computer system is implemented as a stateless computer system. This example may be beneficial because the result in a stateless computer system does not depend upon the internal state of the computer system. This means that when the service is re-executed the result should be the same as when the service was originally executed and the failure of the service was first detected. This may enable the accurate generation of the log file.

Figure 1:
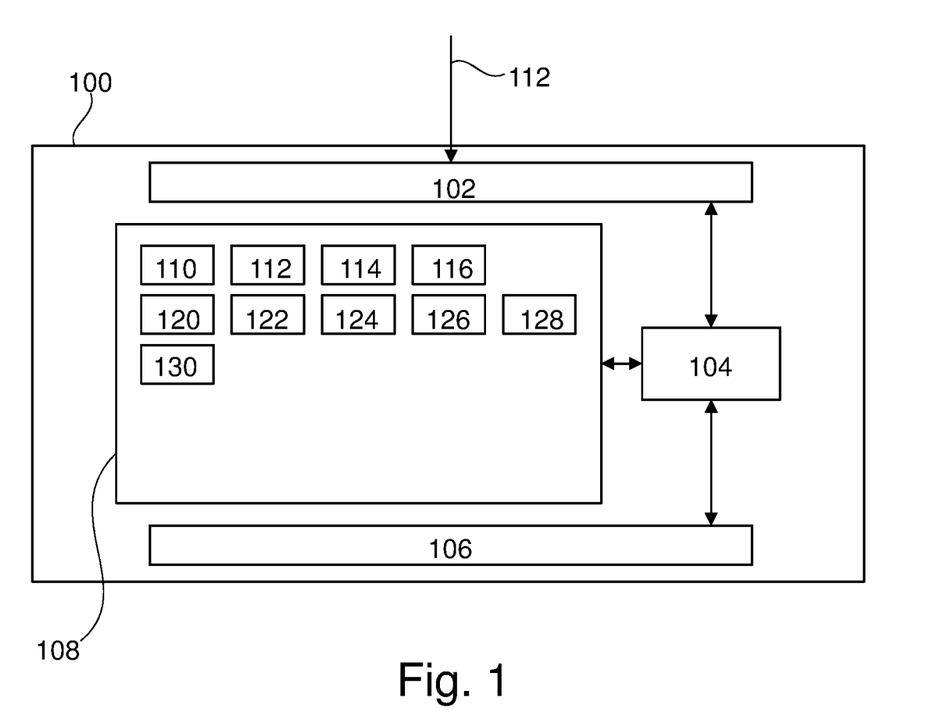
FIG. 1 depicts implementation of a computer system.

FIG. 1 illustrates an example of a computer system 100. The computer system is shown as optionally providing a network interface 102. The network interface 102 may for example enable the computer system 100 to form a network connection with another computer or computer system. The computer system 100 further comprises a processor 104. The processor is in communication with the network interface 102 as well as an optional user interface 106 and a memory 108. The optional user interface 106 may for example be used for the displaying of data and/or providing commands to the computer system 100. The memory 108 may be volatile or non-volatile memory which is accessible to the processor 104. The memory 108 may for example be a computer-readable storage medium.

The arrow labeled 112 indicates a request of a service being sent via the network interface 102 to the computer system 100. The memory 108 is shown as storing program instructions 110. The program instructions 110 enable the processor 104 to perform various operations and functions. The processor 104 receives the request of a service 112 and stores it in the memory 108. The memory 108 is further shown as containing multiple software methods for performing the service that is requested 112. The memory 108 is further shown as containing an indicator of a service failure 116 when the service failed. This may for example be a message or other data. For example, the memory 108 is further shown as containing a stack trace 120. The stack trace 120 is used to determine a subset of the multiple software methods 122. The subset 122 may for example be responsible for causing the service failure. The memory 108 is further shown as containing source code 124. The source code 124 may for example be provided separately, it may be available because the services are implemented as a script, or it may be the result of decompiling the multiple software methods. The source code 124 can then be used to generate modified source code 126, which is also stored in the memory 108, by adding logging statements to the source code 124. The modified source code 126 can then be used for re-perform the service according to the request 112. This results in the generation of the log data 128. The log data 128 can then be compiled or combined into a log file 130.

Figure 2:
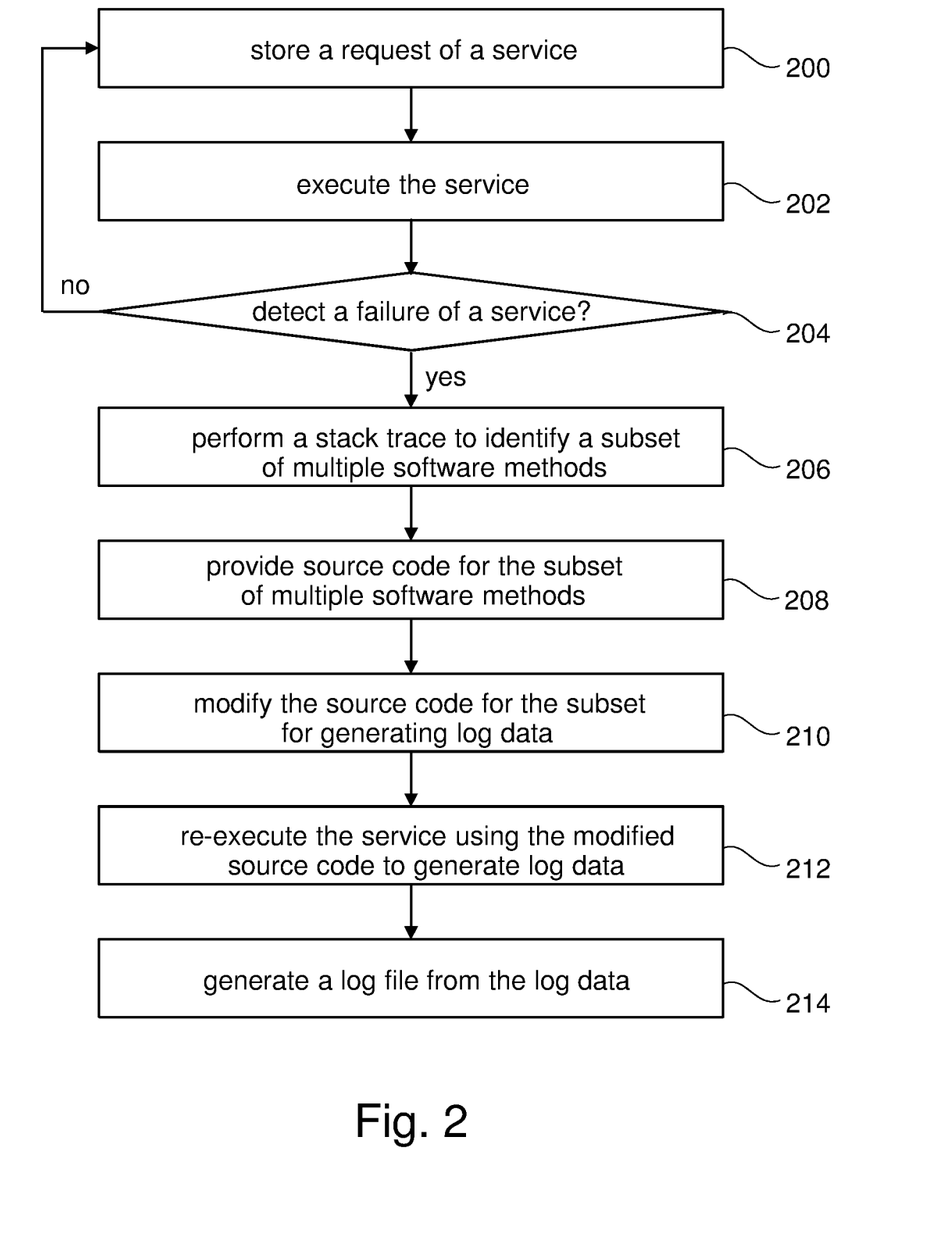
FIG. 2 shows a flow chart that illustrates a method of operating the computer system of FIG. 1.

FIG. 2 shows a flowchart which illustrates a computer implemented method of operating the computer system 100 of FIG. 1 and is described with references to enumerated aspects of computer system 100, shown in FIG. 1. For example, the program instructions 110 may be used to implement the method illustrated by the flowchart in FIG. 2. It should be noted that the method illustrated in FIG. 2 and also the computer system 100 in FIG. 1 can have its functionality split into multiple computers or computer systems. The use of a single computer system 100 in FIG. 1 is merely illustrative.

The method illustrated in FIG. 2 starts at block 200. At block 200, a request 112 of a service to be executed by a computer system is stored in the memory 108. Next at block 202, the service is executed by providing the request 112 to the computer system 100. Next at block 204 a failure of the service is detected. This, for example, may be provided by an explicit message. Blocks 206, 208, 210, 212 and 214 are performed if the failure is detected. Next at block 206, a stack trace 120 is performed to identify a subset 122 of the multiple software methods 114. Then at block 208 source code 124 is provided for the subset 122 of the multiple software methods 114. The source code 124 could be provided from several sources. The source code could for example be retrieved from a repository or could be provided by decompiling the software methods. Then at block 210, the source code 124 is modified for the subset 122 of the multiple software methods 114 by adding logging statements to generate modified source code 126. These logging statements are configured for generating log data. Next at block 212, the service is re-executed using the modified source code 126. This results in the generation of the log data 128. Finally, at block 214, the log file 130 is generated using the log data 128.

The modification of the source code at block 210 may be performed in different ways in different examples. In some cases, the identification of the subset 122 of the multiple software methods 114 is used to automatically generate the logging statements. For example, as the multiple software methods are categorized as a subset, the objects, object members, method parameters and/or automatic variables for this subset 122 may be identified. The step of generating the modified source code 126 then comprises automatically adding logging statements for these objects, object members, method parameters and/or automatic variables at the appropriate location in the source code. In yet more examples the identification of the subset of the multiple software methods comprises identifying execution branches for the subset 122 of the multiple software methods 114. In this case statements can be added to the source code which indicate the state of the execution branches when they are executed and generate log data. In this way the log data 128 and, as a result, the log file 130 can be automatically generated.

Figure 3:
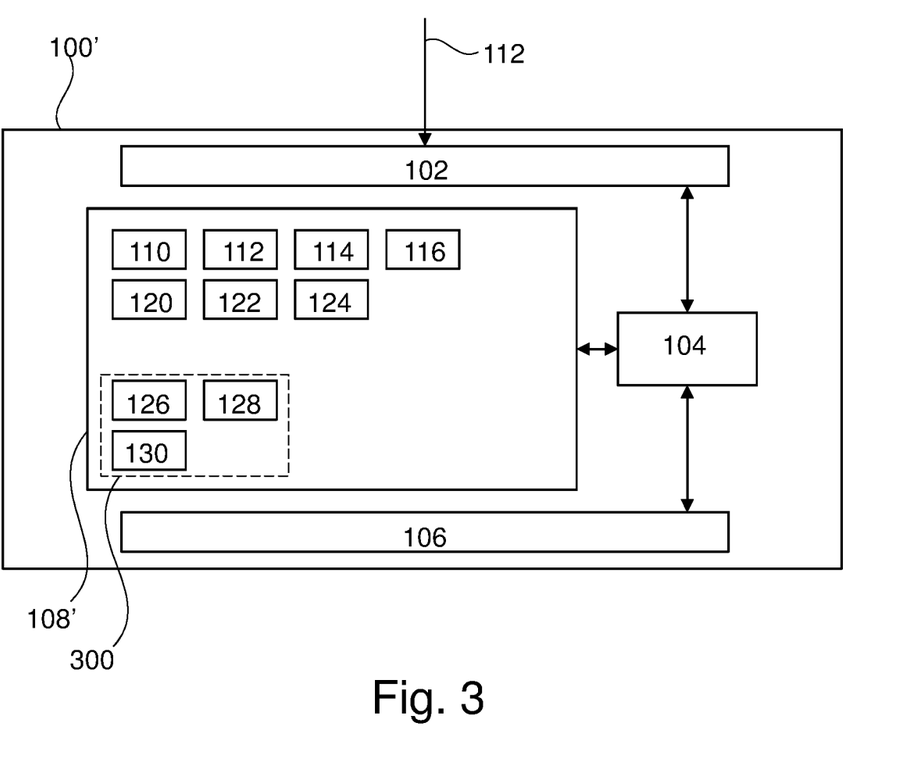
FIG. 3 depicts a further implementation of a computer system.

FIG. 3 illustrates a further example of a computer system 100' that is a modification of the computer system 100 illustrated in FIG. 1. In this example the memory 108' comprises a portion of the memory which forms a sandbox environment 300. The sandbox environment 300 is used to rerun the request 112 using the modified source code 126 in an isolated fashion. The sandbox environment 300 could be implemented on the same computer system 100' or a separate or independent computer system (not shown) could also be used.

Examples may provide for automatic adding logging for failed activity (execution of a program or a service) and the repeating the activity with the original input that caused the problem. Some examples may use a system that has one or more of the following features:

1. The execution can be split into activities (for example processes or microservices) that can be tracked and/or intercepted and repeated (e.g., REST API server). A REST API as used herein is an advanced programming interface (API) that may be used to implement web services according to the Representational State Transfer (REST) architectural style that provides for interoperability of computer systems on the internet.

2. The software can be automatically analyzed and altered (e.g., it is written in one of the script languages like JavaScript, Ruby, etc.). Alternatively the code can be decompiled and recompiled again (e.g., not obfuscated Java code). The analysis is performed automatically by performing a stack trace and then identifying automatic variables, method parameters and identifying execution branches as is described below.

Some examples may comprise an additional software module, which is referred to as an Adaptive Logging Module (ALM) below. The ALM may for example be an implementation of the computer implemented method or the computer program product. The trigger for the use of the ALM could for example be the detection 204 of a failure of a service. In some examples the trigger is a filed request with a matched condition (e.g., a response statue of HTTP 500 Internal Server Error in combination with a stack trace).

An example implementation of the ALM may include one or more of the following steps:

1. The ALM stores the original request (request of a service 112) of a service to be executed by a computer system.

2. The ALM performs a stack trace and creates a list of methods that may require extra logging (identify a subset 122 of the multiple software methods 114).

3. The ALM prepares a list of source code files (provides the source code 124) to alter (which may possibly involve byte code decomplication).

4. The ALM identifies automatic variables/method parameters in the source code for the methods identified in step (2).

5. The ALM identifies execution branches (e.g. if . . . else instructions) in the code of the identified methods.

6. The ALM adds logging (e.g., logging statements) for:
   initial state and changes to variables identified in step (4)
   decision points identified in step (5)

7. The ALM recompiles the code (if needed) and (optionally) executes it in a sandbox environment. The sandbox environment may for example be an environment that is not exposed to an external request.

8. The ALM (optionally) passes the request stored in step (1) to the sandbox environment prepared in step (7).

9. The ALM collects the logs (log data 128) and attaches it to an incident report (log file 130) associated with the failure that triggered the ALM.

Below is pseudo code which is used to illustrate an example. The stack trace below is a stack trace that results after a failed service is detected. The Object Handler below is responsible for handling the request of the service to be executed, which is performed via the method execute below. The state of Handler (member1, member2, member3)+input=original request details is all that is needed to repeat the action after the failure of the service. The methods localRoutine1 and localRoutine2 below represent arbitrary software methods that are performed during execution of the requested service. The method evaluateCondition below represents an arbitrary execution branch that is performed during execution of the requested service. The functions localRoutineN, evaluateCondition may represent some procedure/method which source code can be accessed and/or analyzed and possibly modified. The method externalActionN below may represent a method or procedure that cannot be associated with source code—for example a "black-box" library or system call. In the pseudo code below "input" into the method execute is equivalent to the request that is stored.

```
stack trace:
        -- some method
        -- some method
        -- some method
        -- externalAction2 at Hander.execute line#
```

```
        object Handler:
                //member - some properties of the object handler
                        member1
                        member2
                        member3
        def localRoutine1(input)
        begin
                //for brevity - only mark what properties are being
                read or modified
                read: member1, member2
                write: member1, member3
        end localRoutine1
        def localRoutine2( )
        begin
                read: member1, member2, member3
                write:
        end localRoutine2
        def evaluateCondition(input)
        begin
                read: member1, member2, member3
                write:
        end evaluate Condition
        def execute(input)
        begin
                log("entry handler: $input")
                localRoutine1(input)
                if(evaluateCondition(input, member1, member2,
                member3)) then
                        local_property = externalAction1( ) <--
local property is example of automatic variable - property available
only inside method (smaller scope than e.g. member)
                else
                local_property = localRoutine2( )
                end
                output = externalAction2(local_property) <--
                exception thrown here
                log("exit handler: $output")
                end execute
        end object Handler
```

If the method execute above results in a failed execution, a stack trace can be performed, as outlined above. The code for the method execute can then be modified as shown below. The values of various variables such as member 1, 2 and 3 are for example logged before and after a routine such as local routine 1 is executed. It can also be seen that the values before and after the valuation of the decision point 1 condition is evaluated are also logged. The code below can be generated automatically and then re-executed according to an example.

```
        def execute(input)
        begin
                log("entry handler: $input")
                log("before localRoutine1: $input, $member1,
                $member2") //properties
read by localRoutine1
                localRoutine1(input)
                log("after localRoutine1: $member1, $member3")
//properties modified by localRoutine1
                log("before decision point1")
                decisionPoint1 Condition = evaluateCondition(input,
member1, member2, member3)
                log("decision point1 condition:
                $decisionPoint1Condition")
                if(decisionPoint1 Condition) then
                        log("decision point1 entry: branch IF")
                        local_property = externalAction1( )
                        log("local_property set to $local_property")
                        log("decision point1 exit: branch IF")
                else
                        log("decision point1 entry: branch ELSE")
                        local_property = localRoutine2( )
                        log("local_property set to $local_property")
                        log("decision point1 exit: branch ELSE")
                end
                log("before externalAction2: $local_property")
                output = externalAction2(local_property)
                log("exit handler: $output")
                end execute
```

The above example could, for example, be easily implemented in a scripting language such as JavaScript, Python or Ruby. Also, Java virtual machine-based (JVM-based) languages such as Java or Scala are also easy to decompile and then recompile after logging statements have been added.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method of creating a log file, wherein the method comprises:
    storing a request of a service to be executed by a computer system, wherein the service is performed using a plurality of software methods;
    executing the service by providing the request to the computer system;
    detecting a failure of the service;
    performing a stack trace of the service to identify a subset of the plurality of software methods;
    providing a source code for the subset by decompiling the subset of the plurality of software methods;
    modifying the source code for the subset of the plurality of software methods to add logging statements to generate modified source code, wherein the logging statements are configured for generating log data;
    re-executing the service using the modified source code to generate the log data, wherein re-executing the service using the modified source code comprises passing the stored request of the service to a sandbox environment and executing the modified source code in the sandbox environment according to the stored request; and
    generating the log file from the log data, wherein the log file is configured to be attached to an incident report associated with the failure of the service.

2. The computer implemented method of claim 1, wherein the identifying the subset comprises identifying objects, object members, method parameters and/or automatic variables for the subset, and wherein the modifying the source code for the subset comprises adding variable logging statements for the identified objects, object members, method parameters and/or automatic variables.

3. The computer implemented method of claim 1, wherein the identifying the subset comprises identifying execution branches for the subset, and wherein the modifying the source code for the subset comprises adding decision point logging statements for the identified execution branches.

4. The computer implemented method of claim 1, wherein the log data comprises the request.

5. The computer implemented method of claim 1, wherein the service is a microservice.

6. The computer implemented method of claim 1, wherein method is an HTTP method.

7. The computer implemented method of claim 6, wherein the failure is detected as an HTTP Error 500 status code.

8. The computer implemented method of claim 1, wherein the plurality of software methods is at least partially implemented as byte code, wherein providing the source code for the subset comprises decompiling the byte code.

9. The computer implemented method of claim 1, wherein at least a portion of the subset is at least partially implemented in a scripting language, wherein providing the source code for the subset comprises providing scripts of the portion of the subset.

10. The computer implemented method of claim 9, wherein the scripting language is selected from the group consisting of: JavaScript, Ruby, Python, Perl, TCL, Visual Basic for Applications, and VBScript.

11. The computer implemented method of claim 1, wherein the method further comprises compiling the modified source code before re-executing the service.

12. The computer implemented method of claim 11, wherein the providing the source code comprises decompiling the service.

13. A computer system comprising a memory and a processor, wherein the memory stores program instructions executable by the processor, execution of the program instructions causes the processor to:
   store a request of a service to be executed by the computer system, wherein the service is performed using a plurality of software methods;
   execute the service by providing the request to the computer system;
   detect a failure of the service execution of the program instructions;
   perform a stack trace of the service to identify a subset of the plurality of software methods;
   provide a source code for the subset by decompiling the subset of the plurality of software methods;
   modify the source code for the subset of the plurality of software methods to add logging statements to generate modified source code, wherein the logging statements are configured for generating log data;
   re-execute the service using the modified source code to generate the log data; and
   generate the log file from the log data, wherein re-executing the service using the modified source code comprises passing the stored request of the service to a sandbox environment and executing the modified source code in the sandbox environment according to the stored request, wherein the log file is configured to be attached to an incident report associated with the failure of the service.

14. The computer system of claim 13, wherein computer system is implemented as a stateless computer system.

15. The computer system of claim 13, wherein the identifying the subset comprises identifying objects, object members, method parameters and/or automatic variables for the subset, and wherein the modifying the source code for the subset comprises adding variable logging statements for the identified objects, object members, method parameters and/or automatic variables.

16. The computer system of claim 13, wherein the identifying the subset comprises identifying execution branches for the subset, and wherein the modifying the source code for the subset comprises adding decision point logging statements for the identified execution branches.

17. A computer program product for creating a log file, the computer program product being non-transitory and comprising a computer readable storage medium having program instructions embodied therewith, the program instructions executable by a processor to cause the processor to:
   store a request of a service to be executed by a computer system, wherein the service is performed using a plurality of software methods;
   execute the service by providing the request to the computer system;
   detect a failure of the service execution of the program instructions;
   perform a stack trace of the service to identify a subset of the plurality of software methods;
   provide source code for the subset by decompiling the subset of the plurality of software methods;
   modify the source code for the subset of the plurality of software methods to add logging statements to generate modified source code, wherein the logging statements are configured for generating log data;
   re-execute the service using the modified source code to generate the log data; and
   generate the log file from the log data, wherein re-executing the service using the modified source code comprises passing the stored request of the service to a sandbox environment and executing the modified source code in the sandbox environment according to the stored request, wherein the log file is configured to be attached to an incident report associated with the failure of the service.

18. The computer program product of claim 17, wherein the identifying the subset comprises identifying objects, object members, method parameters and/or automatic variables for the subset, and wherein the modifying the source code for the subset comprises adding variable logging statements for the identified objects, object members, method parameters and/or automatic variables.

19. The computer program product of claim 17, wherein the identifying the subset comprises identifying execution branches for the subset, and wherein the modifying the source code for the subset comprises adding decision point logging statements for the identified execution branches.

* * * * *